Patented Nov. 24, 1953

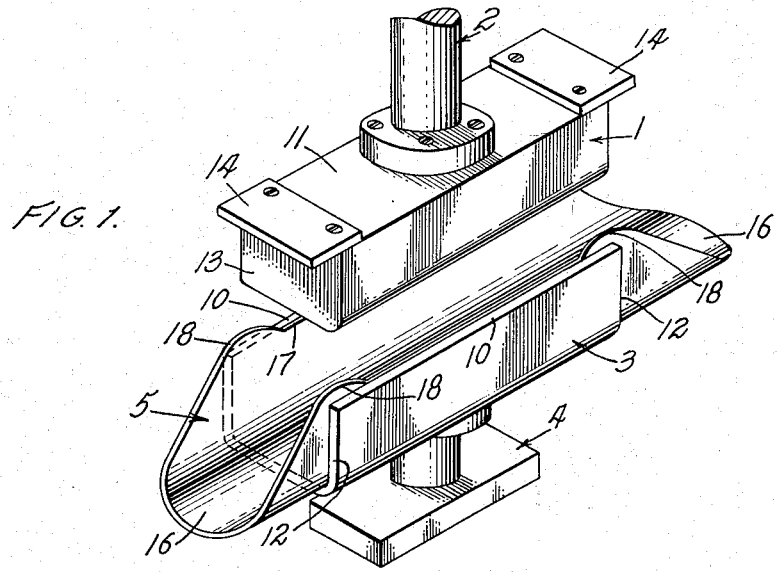
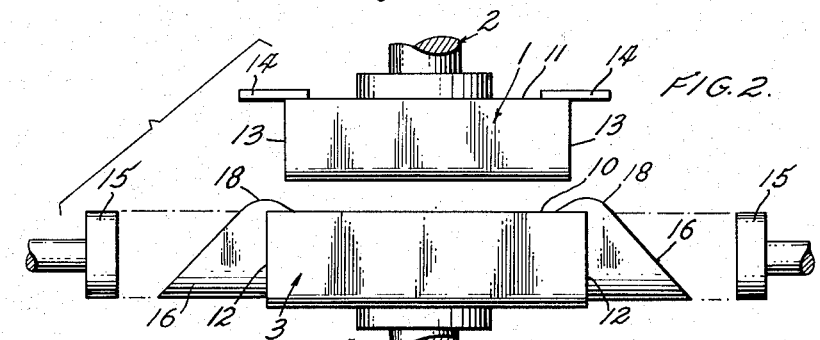
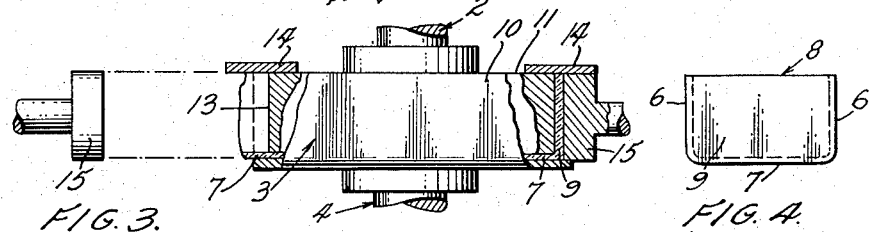
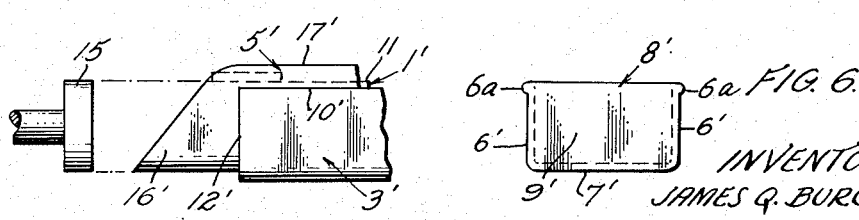

2,659,934

UNITED STATES PATENT OFFICE 2,659,934

METHOD AND APPARATUS FOR MAKING ARTICLES FROM BIAXIALLY ORIENTED THERMOPLASTIC SHEET MATERIAL

James Q. Burgess, West Hartford, Conn., assignor to Plax Corporation, Hartford, Conn., a corporation of Delaware Original application April 7, 1947, Serial No. 740,398. Divided and this application March 30, 1951, Serial No. 220,382

4 Claims. (Cl. 18—19)

The present invention relates generally to the manufacture of articles from molecularly oriented thermoplastic materials, the invention being particularly adapted to the manufacture of transparent display containers from molecularly orientable thermoplastic resin polymers. The present application is a division of U. S. patent application, Serial No. 740,398, filed April 9, 1947, by the present applicant, James Q. Burgess.

Heretofore, transparent display containers, which are in demand for merchandising a wide range of consumer and other types of goods, have been manufactured from a variety of thermoplastic materials by various fabricating processes including: casting; molding; stamping and drawing; blowing; cementing, heat sealing or otherwise securing together prefabricated wall sections; and combinations thereof. These and related methods have numerous characteristic advantages and disadvantages generally involving cost of operation and strength and appearance of product which determine the availability and utility of the product for the many potential markets.

An object of the present invention is to provide novel method and apparatus for manufacturing display containers and other articles of thermoplastic materials, in which the advantages of known practices generally are retained or exceeded and the disadvantages minimized.

The invention is particularly adapted to manufacture of articles, such as display containers, from those thermoplastic resin polymers which are capable of molecular orientation. The vinyl polymers, of which polystyrene is one type, are typical. These polymers in their unoriented condition have the advantage of rigidity coupled with the disadvantage of brittleness which makes necessary relatively thick cross section for integrity or strength. However, it is known that the tensile strength of such polymers may be substantially increased by molecular orientation. Thus, polystyrene, as an example, forms a relatively rigid though brittle foil or sheet when its molecules are not oriented and a considerably tougher and more flexible sheet when the molecules are oriented.

Molecular orientation is readily obtained as by stretching a sheet or ribbon of the polymer at a temperature higher than its softening point and maintaining the stretch condition under tension until the temperature has been lowered below the softening point. One method of forming such sheet is to extrude the polymer in the form of a ribbon and then stretch it both transversely and longitudinally under selected temperature conditions to effect biaxial orientation. The method of forming such sheet is not, per se, a part of the present invention.

Biaxially oriented sheet, in adition to its toughness and flexibility, is transparent and therefore particularly suited for manufacture into packaging containers in which the packaged article may be displayed to advantage.

Two additional characteristics of molecularly oriented thermoplastics which are utilized to advantage in the present invention are: first, the fact that when heated to or above its softening point, without mechanical restraint, the oriented material is returned to its unoriented shape and to a plastic condition suitable for a subsequent reforming operation, and, second, the fact that the relaxation forces may be mechanically restrained and molecular orientation retained even though the temperature of the material is held at or above the softening temperature for a limited time.

The present invention utilizes both of these factors and involves a procedure in which orientation is retained in portions of a plastic material and released in other portions to produce an article having both oriented and not oriented portions. Otherwise stated, articles are formed by controlling the relaxation of molecularly oriented material about a forming member.

Generally, the present invention involves securing a portion only of a blank or preform of oriented material between cooperating forming and restraining members. Thereafter, the unrestrained portions of the blank are softened to plasticity as by heating to a temperature above the softening point of the material and orientation forces freely relaxed. The disoriented portions shrink along the lines of orientation and thicken at right angles thereto. When subsequently cooled below the softening point of the material, a structure, as for example, a display container, results which is composed, in part, of rigid disoriented sections and, in part, of tough, flexible oriented sections.

For a better understanding of the invention, reference should be made to the following description of embodiments thereof shown in the accompanying drawings, and in which drawings:

Fig. 1 is a perspective view in open position of male and female members of a restraining and shaping press and shows a blank or preform of molecularly biaxially oriented sheet to be formed, in accordance with the invention, into a box;

Fig. 2 is a front elevation in open position of the apparatus shown in Fig. 1, and of the two members for finishing the end walls of the box;

Fig. 3 is a view similar to Fig. 2 showing the press in closed position and the formation of one of the end walls of the box between the male press member and one of the end forming members;

Fig. 4 is an end elevation or profile view of a plastic box formed from the blank or preform by the apparatus shown in Figs. 1 through 3;

Fig. 5 is a view similar to Fig. 3 of one end of a slightly modified forming and restraining press and of a suitable preform or blank for producing a modified type of container; and Fig. 6 is a view similar to Fig. 4 of the modified type of container formed from the blank shown in Fig. 5.

Referring to the drawings, apparatus is illustrated more or less schematically for forming articles from molecularly oriented thermoplastic sheet material in accordance with the invention. It will be understood that the shape of the forming members incorporated in the apparatus may vary considerably depending upon the shape of the article which is to be formed. The apparatus illustrated in the drawings is adapted to the formation of open-top boxes and consists of a generally rectangular block or male forming member 1 secured to the lower flanged end of a vertically movable force member or piston 2, and a cooperating channel or female forming member 3 of U-shaped cross section secured to a stationary support 4. Suitable means (not shown) are, of course, provided for moving the male forming member 1 into and out of pressing engagement within the U-shaped lower forming member 3. When the forming members are in their closed position (Fig. 3), the contiguous walls of the members 1 and 3 are adapted to firmly secure predetermined portions of a blank or preform 5 cut from a sheet of oriented thermoplastic material therebetween. The portions of the preform or blank 5 located between the forming members 1 and 3 are the portions which correspond to and form side and bottom walls 6 and 7 of a plastic box 8 shown in Fig. 4.

In order to form end walls 9 of the box 8 with the embodiment of the invention illustrated in Figs. 1 through 3, the depths of the upper and lower forming members 1 and 3 are such that, in the closed positions relative to one another, the upper edges 10 of the member 3 are in substantial alignment with the upper surface 11 of the member 1 and the ends 12 of the lower or female forming member extend slightly beyond the end walls 13 of the upper member 1. Secured to the upper surface 11 at each end of the forming member 1 are flat plates which are of the same width as the forming member 1 and form flanges 14 extending beyond the male forming member ends 13. The flanges 14, together with the ends 12 of the lower forming member 3 which protrude beyond the end walls 13 of the male forming member, define an opening to receive like shaped end forming members 15 which are movable into and out of the opening to shape the end portions 16 of the blank 5 into the end walls 9 of the box 8. In connection with the shaping of the box end walls 9, a means, as for example, a solvent, or preferably heat, is provided for releasing orientation and rendering plastically reformable the end portions 16 of the blank 5 which protrude beyond the ends of the forming member 1. One or more Bunsen burner flames are suitable for this purpose. A preferred arrangement is to move the burners with the upper forming member 1 so as to concentrate heat and establish a softening temperature in the end portions 16 of the blank only when the forming members 1 and 3 are in their closed positions.

Various types of thermoplastic materials may be shaped with the described apparatus. Polystyrene sheet biaxially molecularly oriented substantially uniformly along both axes to sixteen times its unoriented area and, consequently, to one-sixteenth of its unoriented thickness, is illustrative of one type of material suitable for this purpose. This sheet is transparent and has the desirable characteristics of toughness and flexiblity in the oriented condition.

Preferably, the blank 5 cut from such sheet has the general shape illustrated in Figs. 1 and 2. The width of the blank generally conforms to the peripheral distance along the inner surface of the forming member 3 between the edges 10 so that, when secured between the cooperating male and female forming members 1 and 3, its edges 17 coincide with the edges 10 throughout the length of the forming member 1 except for the curved portions or tabs 18 (Figs. 1 and 2) which extend above the edges 10 and thereafter curve downwardly to form the blunted blank ends 16. The exact shape of the blunted ends 16 is dependent upon the amount of orientation in the sheet, the ends being shaped or designed so that when they are heated above the softening point (180° F. for polystyrene) in the absence of mechanical restraint, captured orientation stresses are released and they thicken and, at the same time, shrink to a shape and size corresponding to the shape of the end walls 13 of the male forming member and into engagement with those end walls. Thereafter, as illustrated in Fig. 3, the end forming members 15 may be moved inwardly to press the plastic mass of the disoriented end portions of the sheet firmly into engagement with the end walls 13 of the forming member 1 and finish the end walls 9 of the box. During this operation, the flange members 14, and the protruding ends 12 of the female forming member 3, cooperate to retain the desired end contours. The box ends 9 thus formed have a substantially greater thickness than the portions 16 of blank 5 from which they are formed, and, inasmuch as orientation has been substantially relieved, constitute rigid, shape retaining structural portions of the box 8. However, the portions of the blank 5 secured between the forming members 1 and 3 which constitute the tough, flexible side and bottom walls 6 and 7 of the box are prevented by the restraint of members 1 and 3 from appreciably releasing their orientation forces.

The box 8, thus formed, has rigid end walls 9 which serve to retain the proper location of the side and bottom walls 6 and 7 when the box is removed from the male forming member 1. In this connection, slight slippage of the portions of the blank 5 is permitted between the forming members 1 and 3 at the corners adjacent the blank tabs 18 so that the edges of the tabs may shrink into alignment with the straight open edges and provide, with end walls 9, reinforcing and rigidifying square open corners for the box as shown in Fig. 4.

Fig. 5 illustrated one end of a slightly modified forming apparatus and a portion of a modified thermoplastic preform or blank 5' for forming the box 8', shown in Fig. 6, the side walls 6' of which have rigidifying and reinforcing beaded edges 6a. The box 8' is similar to the box 8, shown in Fig. 4 and heretofore described, save for the beaded side edges 6a which provide additional shape stability to the box.

The parts of the apparatus partially shown in Fig. 5 for forming the box 6' are identical with and are designated by the same reference numerals as the like corresponding parts of the apparatus illustarted in Figs. 1 through 3, except for the lower forming member 3', the upper side edges 10' of which are spaced downwardly from the upper surface 11 of the male forming member 1, a distance equal to the width of the reinforcing bead 6a.

The shape of the ends 16' of the preform or blank 5', which preferably is cut from a sheet of biaxially oriented plastic, as for example, polystyrene, is dependent upon the amount of orientation in the sheet in the same manner as the corresponding portions 16 heretofore described. The blank 5' differs from the blank 5 in that it is without tabs for reinforcing corners and, further, in that it is wider. The amount of additional width is dependent primarily upon the lateral orientation in the blank. As an example, if the sheet from which the blank 5' is cut is oriented approximately equally both longitudinally to sixteen times its unoriented area, or four times both its unoriented length and width, the blank 5' should be of sufficient width so that, when secured between the forming members 1 and 3', the distances from the lower forming member edges 10' to the edges 17' of the blank are approximately four times the distance from the edges 10' to the top surface 11 of forming member 1. Otherwise stated, the ratio of the width of the free or laterally unrestrained portions of the blank 5' to the width of the bead desired should approximately equal the lateral orientation of the blank which is the ratio of its oriented to its unoriented width, it being understood that allowance may have to be made for loss of recovery forces because of mechanical restraint which may be longitudinally imposed on the free edges of the blank when they are heated above the softening of the thermoplastic material of which they are formed.

It will be seen that when the end portions 16' and laterally unrestrained side edge portions of the blank 5' are heated and orientation stresses freely relaxed, the apparatus embodying the invention (Fig. 5) is adapted to provide the box 8' (Fig. 6) with a substantially rigid framework formed by rigid end walls 9' and the connecting rigidifying beads 6a and with thin, tough and flexible side and bottom walls 6' and 7'.

While the heating step of both embodiments illustrated has been described as applying to the mechanically unrestrained portions of the blanks 5 and 5', it is not necessary that heating to above the softening point be limited to those portions and, as a practical matter, it would be extremely difficult, if not impossible, to limit softening temperatures to those portions. However, the restraint imposed by the forming members is sufficient to maintain the oriented shape and thinness of the portions of the blank therebetween even though those portions are heated above the softening point. Furthermore, unless the temperatures established in those portions are unnecessarily higher than the softening point or for unnecessarily long periods, orientation stresses mechanically restrained are not materially relieved.

Preferred practice of the present invention when the thermoplastic preform is formed, for example, from 10 mil polystyrene sheet biaxially oriented substantially uniformly along both axes to approximately one-sixteenth its original thickness, is to heat the mechanically unrestrained portions of the blank in the temperature range of 205° to 260° F. At that temperature, orientation stresses are relieved and the article formed about the male forming member in a matter of seconds. In performing the end wall finishing operations, the end forming members 15 are preferably maintained at approximately the softening temperature of the plastic so that no cold scars are produced and the plastic sets quickly following removal of the forming members 15. Though not shown in the drawings, it will be appreciated that a variety of conventional temperature regulating means, as for example, circulation of a temperature controlling medium within the forming members 15 may be provided for that purpose.

While the illustrated embodiments only disclose apparatus for forming rectangular boxes, it will be understood that the invention is limited neither to that type article or to that general shape. Semi-cylindrical display covers have been made having both the full ends of the type shown in Figs. 4 and 6, and partial ends having a concentric semi-circular recess which permits, for example, the handle of a brush mounted on a display board to protrude from the inverted display container or cover attached to the board, while the brush proper is protected and displayed by the cover.

Numerous other adaptations of the invention to a variety of products will be apparent as the present invention provides novel method and apparatus for producing novel articles characterized by the incorporation of both oriented and unoriented portions in an integral thermoplastic product.

The invention has the advantage of requiring a minimum of material for a product which is tough and strong, and in addition, relatively rigid and shape stable.

The novel method provides uniform orientation and uniform oriented wall thickness.

Having thus described two of the possible embodiments of the invention, I claim:

1. The process of forming a vessel about a forming member from a preform of biaxially oriented thermoplastic flat sheet, which comprises curving the preform about an axis into partial contact with the forming member to form side and bottom walls of the vessel, securing the portion in contact with the forming member against movement relative to the forming member, relaxing orientation and reforming the remaining portion into contact with portions of the forming member angularly disposed to said axis to form end walls of the vessel.

2. The process described in claim 1 wherein relaxation is effected by heating the said remaining portion above the softening point of the material, pressing the softened portions against the forming member and, thereafter, cooling and removing the vessel thus formed from the forming member.

3. The process of manufacturing an open box about a forming block from a preform of biaxially oriented thermoplastic sheet, including holding the preform intermediate its ends and sides in surface contact with the bottom and two opposite sides of the block, heating above the softening point and biaxially relaxing orientation and shrinking the ends of the preform into contact with opposite ends of the block, similarly substantially monoaxially relaxing orientation in the side edges of the preform, pressing the softened and relaxed end portions into contact with said block ends while peripherally restraining said portions, cooling, and removing the box thus formed from the forming block.

4. Apparatus for manufacturing an open box from a preform of biaxially oriented thermoplastic sheet, including a movable forming block of less length than said preform and having a bottom surface and parallel side and end surfaces at right angles to one another, a channel member of greater length than said block and having a bottom and side walls arranged to conform to and secure the preform intermediate its sides and end in close surface engagement with the corresponding walls of said block, means for moving the block and channel into securing relationship with the preform secured therebetween, means for effecting biaxial disorientation and rendering plastic the unsecured end portions of the preform and substantially monoaxially disorientation of the unsecured side portions, press members for forcing the unsecured and disoriented end portions into surface contact with the ends of said block, and flanges on said block cooperating with the ends of the channel member for determining the peripheral shape of the pressed plastic ends.

JAMES Q. BURGESS.

References Cited in the file of this patent

UNITED STATES PATENTS

| Number | Name | Date |
| --- | --- | --- |
| 825,116 | Engels | July 3, 1906 |
| 2,257,018 | White | Sept. 23, 1941 |
| 2,439,716 | Canfield et al. | Apr. 13, 1948 |